3,503,925
SILOXANE RESINS
Philip A. Griffin, Glamorgan, Wales, assignor to Midland Silicones Limited, Reading, Berkshire, England
No Drawing. Filed Apr. 4, 1968, Ser. No. 718,900
Claims priority, application Great Britain, Apr. 12, 1967, 16,725/67
Int. Cl. C08f 11/04
U.S. Cl. 260—46.5    8 Claims

ABSTRACT OF THE DISCLOSURE

Quaternary ammonium silanolates and quaternary phosphonium silanolates are used as curing catalysts for organopolysiloxane resins which are soluble in organic solvents and which contain less than 0.25 percent by weight of silanol groups. The catalysed organopolysiloxane resins are useful in the preparation of void-free laminates and encapsulating materials.

---

This invention relates to a composition comprising organopolysiloxane resins and certain quaternary compounds.

It is known that organopolysiloxane resin compositions may be converted to the cured, insoluble state in the presence of catalysts such as quaternary ammonium hydroxides and metal organic compounds. The curing reaction in such cases involves the condensation of silanol groups present in the resin with the elimination of water.

The formation of water consequent on the curing of the resin creates certain processing difficulties since it is associated with the creation of voids in the resin mass. This difficulty is of special significance when the organopolysiloxane is employed as a laminating resin since it makes it necessary to subject the laminate to a prolonged curing schedule. Attempts to expedite the curing of the resin by employing higher temperatures and/or shorter curing times has often resulted in bubbling of the resin or, more usually, blistering and delamination of the laminate prepared from the resin. The formation of water has also imposed a significant practical limitation on the maximum thickness of the laminate.

It has been proposed to overcome the formation of voids during the curing of organopolysiloxane resins by prior treatment of the resin to convert it to the solventless, silanol free state. It has also been proposed to further polymerise resins of this type with alkali metal hydroxides, alkali metal salts of organosilanols or organometallic compounds. The use of these materials as catalysts for silanol free organopolysiloxane resins however leaves much to be desired since organometallic compounds can interfere with the electrical insulation properties of the resin and alkali metal hydroxides and alkali metal salts of organosilanols are either inherently incompatible with the resin system, and are thus difficult to maintain in admixture therewith, or else may cause subsequent depolymerisation of the cured resin.

Many applications of organopolysiloxane resins, for example coating or laminating applications, requires the resins to be employed in the form of a solvent solution. Further most applications for which siloxane resins are intended also require the maintenance of the best attainable electrical insulation properties. For at least these reasons the prior art proposals have not pointed to a solution of the problem of providing a resin having a reduced tendency to voids while retaining good electrical properties and resistance to depolymerisation.

We have now found that a certain class of quaternary ammonium or quaternary phosphonium compounds are effective curing catalysts for silanol-free organopolysiloxanes. We have also found that the said quaternary compounds do not exhibit the disadvantages arising with the use of catalysts previously proposed for curing silanol-free organopolysiloxanes and are therefore of particular utility as curing catalysts for organopolysiloxane resin compositions having reduced tendency to void formation or curing.

Accordingly this invention provides a composition comprising a mixture of (1) an organic solvent soluble organopolysiloxane resin which contains less than 0.25 percent by weight of silanol groups, and (2) as a curing agent for the resin a quaternary compound which is a quaternary ammonium silanolate, a quaternary phosphonium silanolate or a mixture thereof.

The invention also includes a process for the preparation of a cross-linked organopolysiloxane resin which comprises forming a composition as claimed in any one of the preceding claims and heating the said composition to a temperature of at least 50° C. for a time sufficient to effect the desired degree of cross-linking in the resin.

The organopolysiloxane resins which comprise component (1) of the compositions of this invention are those containing from 0.9 to 1.85 and preferably from 1.0 to 1.8 organic radicals per silicon atom. As the silicon-bonded organic radicals there are present in the organopolysiloxane predominantly monovalent hydrocarbon radicals for example, alkyl radicals containing less than 5 carbon atoms such as methyl, ethyl, and propyl radicals, allyl radicals such as vinyl and allyl and aryl radicals such as phenyl and tolyl radicals. A minor proportion of the radicals, preferably less than 10 percent of the total, may be monovalent substituted hydrocarbon radicals or monovalent hydrocarbonoxy radicals such as aminoalkyl, haloalkyl, cyanoalkyl or alkoxy radicals. The resins of commerce are however predominantly those containing methyl and/or phenyl radicals and such resins are thus preferred for use in the compositoins of this invention. The resin may be a homopolymer and may contain for example only $CH_3SiO_{1.5}$ groups in its structure. More preferably however the resin will be a copolymer of two or more different types of units and may therefore consist of one or more trifunctional units, for example $CH_3SiO_{1.5}$ or $C_6H_5SiO_{1.5}$ with, for example, one or more dimethylsiloxane, diphenylsiloxane, phenylmethylsiloxane, triphenylsiloxane or $SiO_2$ units.

The organopolysiloxane resin (1) should be substantially free of silanol (SiOH) groups, that is, it should be substantially completely condensed. At the same time the resin should not be so highly polymerised that it has become insoluble in organic solvents. The method of preparation of the resin should thus be such as to minimise the formation of silanol groups, at the same time avoiding an increase of molecular weight as would render the resin insoluble. Alternatively silanol groups present in the resin may be condensed by treating the resin after preparation. One suitable method of reducing the silanol content of the resin to the desired extent involves contacting the resin with a strong base, such as potassium hydroxide, under conditions whereby the silanol groups are condensed and the increase in molecular weight is minimised.

In another method of reducing the silanol content of the resin it may be mixed with an organosilicon compound containing an atom, or a radical, for example a hydrogen atom or an ethoxy radical, reactive with the silanol groups, in the presence of a suitable catalyst, for example a metal organic compound such as dibutyltin dilaurate, stannous octoate, zinc naphthenate and lead octoate.

Complete elimination of the silanol groups from the resin is difficult and often impossible to achieve. The degree of bubbling and blistering in the resin is determined to a considerable extent by the silanol content of the resin and preferably this is reduced as far as possible to obtain the maximum advantage. Thus although a significant reduction of bubbling or blistering is obtained by reducing the silanol level, expressed as the weight of SiOH, to about 0.25 percent by weight of the resin, for the purpose of this invention we prefer to employ siloxane resins wherein the silanol content is 0.15% by weight or less.

In general the organopolysiloxane resin will be employed as a solution in an organic solvent, for example toluene, xylene or other hydrocarbon. The presence of solvent is not however, essential as the process of this invention also finds application in the curing of the so-called solventless siloxane resins.

As the quaternary compound which comprises component (2) of the compositions of this invention there is used a quaternary ammonium silanolate or a quaternary phosphonium silanolate. These quaternary salts are known materials and may be prepared for example by the reaction of a quaternary ammonium or phosphonium hydroxide or alkoxide with an organosilane or an organosiloxane. Any quaternary ammonium or phosphonium hydroxide or alkoxide may be employed to prepare the silanolate compound including for example cyclopentyl trimethyl ammonium hydroxide, tetraethyl ammonium butoxide, tetraethylphosphonium hydroxide, isopropyltrimethyl phosphonium hydroxide and beta hydroxyethyltrimethyl ammonium hydroxide. Because of the superior stability on storage of the corresponding silanolates the quaternary ammonium compounds are preferred over the quaternary phosphonium compounds, tetramethylammonium hydroxide and benzyltrimethyl ammonium hydroxide being most preferred.

The term "silanolate" is employed herein for the sake of brevity but includes both the silane and siloxane derived materials.

It is advantageous that the quaternary compound be compatible, that is miscible in the required proportions, with the organopolysiloxane resin or the solvent solution thereof. Such compatibility is best achieved by suitable choice of the organosilane or organosiloxane which is reacted with the quaternary compound to prepare the silanolate. Thus, for example, when the organopolysiloxane contains both methyl and phenyl radicals as the silicon-bonded organic radicals the silanolate compound is preferably prepared from an organosilane or organosiloxane which also contains methyl and phenyl radicals. Similarly, when the organic radicals in the organopolysiloxane resin are methyl radicals the silanolate is preferably prepared employing a methyl silane or methyl siloxane. Since commercial organopolysiloxane resins are predominantly those containing both methyl and phenyl radicals the preferred quaternary compounds are those obtained from a methylphenyl polysiloxane, the compound cyclic phenylmethyltetrasiloxane being particularly suitable.

The proportion of the quaternary compound present in the compositions of this invention preferably falls within the range from about 0.1 to about 5 percent by weight based on the weight of the organopolysiloxane resin. However, depending on the weight ratio of the siloxane residue to quaternary ammonium or phosphonium residue in the silanolate it may be more appropriate in some cases to employ quantities of the silanolate falling outside this range.

The compositions of this invention may be converted to the cross-linked state at temperatures as low as 50° C. and are useful in a variety of applications, for example as coating or encapsulating materials. The compositions are however of particular applicability in the preparation of silicone resin laminates where the problem of blistering of the laminates during the curing cycle often arises.

Depending mainly on the silanolate catalyst or the application in which the composition is employed the temperature at which curing, that is cross-linking, of the composition is brought about can vary considerably. Normally however, heating the resin to a temperature in the range from 50 to about 200° C. is sufficient to achieve the desired degree of cross-linking of the resin. If desired the initial curing step may be followed by a post cure.

The following examples illustrate the invention.

EXAMPLE 1

A 60 percent by weight solution in toluene of a phenylmethyl siloxane resin containing 1.35 total phenyl and methyl radicals per silicon atom and having a ratio of methyl to phenyl radicals of 1.16 to 1 was refluxed for 4 hours with potassium hydroxide which had been added in a quantity sufficient to give 1 potassium atom for every 300 silicon atoms. Prior to refluxing the resin had a molecular weight of 1780 and a silanol (SiOH) content of 2.73 percent by weight. After refluxing sufficient acetic acid to neutralise the potassium hydroxide was added to and thoroughly mixed with the resin. The potassium acetate formed was then removed by filtration. The silanol content of the resin thus obtained was less than 0.25 percent by weight and the molecular weight of the resin was found to have increased to 5,600.

To the condensed resin solution was added, in a quantity of for every 100 g. of resin solution, a catalyst solution which was prepared by refluxing a mixture of tetramethyl ammonium hydroxide [27.3 g. of a 25% w./w. aqueous solution], cyclic phenylmethyltetrasiloxane (181.6 g.) and benzene (151 g.) until all of the water had been azeotropically removed.

Twenty ten inch squares of 5X heat cleaned glass cloth were then impregnated with the resin solution and dried and precured by heating at 70° C. for 10 minutes. The pieces of resin impregnated glass cloth were then superimposed and the assembly hot pressed into a 20 ply laminated board at a pressure of 1000 p.s.i. and a temperature of 175° C. for 30 minutes. The press was then cooled and the laminated board examined and found to be of good appearance. The board was immediately subjected to a post cure in an oven at 250° C. and did not blister. A control laminate which had been similarly prepared from the silanol-containing resin blistered on post-curing at 250° C.

EXAMPLE 2

A 20 percent by weight solution in toluene of a phenylmethylsiloxane resin containing 1.36 total phenyl and methyl radicals per silicon atom and having a methyl to phenyl ratio of 2.3 to 1 was refluxed for 4 hours with potassium hydroxide which had been added in a quantity sufficient to give 1 potassium atom for every 300 silicon atoms. Toluene was then removed from the solution until the remainder of the solution contained 40 percent by weight of resin solids. At this stage the KOH was removed from the solution in the manner described in Example I. Further toluene was then removed by distillation until the product contained 60% by weight of resin solids. This product was found to have a molecular weight of 3020 and a silanol content of less than 0.25% by weight.

To this resin solution was added, in a quantity of 3.0 ml. for every 100 g. of resin solution, a catalyst solution which had been prepared by refluxing a mixture of benzyltrimethylamonium hydroxide (25.1 g. of a 40% w./w. aqueous solution), cyclic phenylmethyltetrasiloxane (145.2 g.) and toluene (122 g.) until all the water had been azeotropically removed.

The catalysed resin solution was then employed in the manner described in Example 1 to prepare a 20 ply laminated board except that the precure was performed at 85° C. for 10 minutes.

When the board was subjected to a post cure at 250° C. no blistering occurred.

EXAMPLE 3

The procedure of Example 2 was repeated employing a methylphenylpolysiloxane resin containing 1.0 total phenyl and methyl radicals per silicon atom, the pressing operation being performed at 140° C. and 1000 p.s.i. for 1 hour. Results similar to those of Example 2 were obtained.

EXAMPLE 4

A mixture of methyl trichlorosilane, dimethyldichlorosilane and phenyl trichlorosilane in molar proportions of 2.41:1:2.91 was added to an agitated mixture of toluene and water the latter being present in a large excess over that required to hydrolyse the silicon-bonded chlorine atoms and the toluene being sufficient to give a 10% by weight solution of the hydrolysate. After separation of the aqueous phase KOH was added to the hydrolysate solution in a proportion sufficient to give one potassium atom for every 300 silicon atoms and the mixture then refluxed until all of the water formed had been removed azeotropically. The solvent was removed from the resulting solution to provide a solid organopolysiloxane resin. The silanol content of this resin was less than 0.1% by weight and its molecular weight was 1700.

The solid resin was dissolved in cyclic phenylmethyltetrasiloxane $[C_6H_5.CH_3SiO]_4$ in a weight ratio of 1.8:1 respectively to give a liquid solventless resin composition. To the composition was then added 5 percent by weight of a solventless silanolate catalyst which has been prepared by heating a mixture of 1 part by weight of solvent-free benzyltrimethylammonium hydroxide with 10 parts by weight of cyclic phenylmethyltetrasiloxane at 70° C. under an atmosphere of nitrogen for 1 hour.

The catalysed resin was then cured in a mould by heating at 120° C. for 4 hours the cured resin being obtained as a hemispherical pellets of approximately 2.0 cm. diameter. The degree of cure of the resin was measured by immersing a sample of the cured resin in toluene for 72 hours and thereafter recovering the resin and calculating its loss of weight. The loss of weight value obtained was 7.3 percent, this indicating a good degree of cure in the resin.

EXAMPLE 5

A 10% by weight solution in toluene of a methylsiloxane resin containing 1.20 methyl radicals per silicon atom was refluxed with KOH in the manner described in Example 1 to reduce the silanol content of the resin. After neutralising the KOH with acetic acid solvent was removed from the resin solution to give a resin content of 60% by weight. The silanol content of the resin was approximately 0.08 percent by weight.

To this resin solution was added in a quantity of 1.0 ml. for every 100 g. of resin solution, a catalyst solution prepared by refluxing together tetramethylammonium hydroxide (120 g. of a 25% aqueous solution), cyclic octamethyltetrasiloxane (434 g.) and toluene (664 g.) until all of the water was removed.

The catalysed solution was employed to impregnate pieces of glasscloth which were then precured at 70° C. for 10 minutes and laminated by hot pressing at 1000 p.s.i. for 60 minutes at 140° C. The laminates were of good appearance and did not blister during a post-cure at 250° C. for 16 hours.

That which is claimed is:

1. A composition comprising a mixture of (1) an organic solvent soluble organopolysiloxane resin having an organic substituent to silicon ratio in the range from 0.9/1 to 1.85/1, at least 90 percent of said organic substituents being monovalent hydrocarbon radicals, which contains less than 0.25 percent by weight of silanol groups, and (2) a curing catalyst for the said organopolysiloxane resin which is a quaternary compound selected from the group consisting of quaternary ammonium silanolates, quaternary phosphonium silanolates and mixtures thereof.

2. A composition as claimed in claim 1 wherein the silicon-bonded organic radicals in the organopolysiloxane resin are methyl radicals and phenyl radicals.

3. A composition as claimed in claim 2 wherein the quaternary compound is the reaction product of a quaternary ammonium hydroxide and a phenylmethyl organosiloxane.

4. A composition as claimed in claim 3 wherein the organosiloxane is phenylmethylcyclotetrasiloxane.

5. A composition as claimed in claim 3 wherein the quaternary ammonium hydroxide is tetramethyl ammonium hydroxide or benzyltrimethylammonium hydroxide.

6. A composition as claimed in claim 1 wherein the organopolysiloxane resin has been prepared by contacting a silanol-containing organopolysiloxane resin with a strongly basic silanol condensation catalyst for a time sufficient to reduce the silanol content to less than 0.25 percent by weight of the organopolysiloxane resin.

7. A process for the preparation of a cross-linked organopolysiloxane resin which comprises forming a mixture of (1) an organic solvent soluble organopolysiloxane resin which contains less than 0.25 percent by weight of silanol groups and has an organic substituent to silicon ratio in the range from 0.9/1 to 1.85/1, at least 90 percent of said organic substitutents being monovalent hydrocarbon radicals, and (2) a curing catalyst for the said organopolysiloxane resin which is a quaternary compound selected from the group consisting of quaternary ammonium silanolates, quaternary phosphonium silanolates and mixtures thereof, and thereafter heating the said mixtures of (1) and (2) to a temperature of at least 50° C. for a time sufficient to effect the desired degree of cross-linking of the organopolysiloxane resin.

8. A process as claimed in claim 7 wherein the quaternary ammonium compound is present in the mixture of (1) and (2) in a proportion of from 0.1 to 5 percent by weight based on the weight of organopolysiloxane resin (1).

References Cited

UNITED STATES PATENTS

| | | | |
|---|---|---|---|
| 2,739,952 | 3/1956 | Linville | 260—30.6 |
| 2,883,366 | 4/1959 | Kantor et al. | 260—46.5 |
| 2,884,432 | 4/1959 | Gordon | 260—448.2 |
| 3,002,951 | 10/1961 | Johannson | 260—46.5 |
| 3,017,386 | 1/1962 | Brown et al. | 260—46.5 |
| 3,162,614 | 12/1964 | Katchman | 260—46.5 |

DONALD E. CZAJA, Primary Examiner

M. I. MARQUIS, Assistant Examiner

U.S. Cl. X.R.

117—161; 156—329; 161—93, 193; 252—63.7